US006434447B1

(12) United States Patent
Shteyn

(10) Patent No.: US 6,434,447 B1
(45) Date of Patent: Aug. 13, 2002

(54) CONTROL PROPERTY IS MAPPED MODALLY COMPATIBLE GUI ELEMENT

(75) Inventor: Yevgeniy Eugene Shteyn, Cupertino, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/165,682

(22) Filed: Oct. 2, 1998

(51) Int. Cl.[7] ............................................. G06F 19/00
(52) U.S. Cl. ....................... 700/245; 700/246; 709/220; 709/230; 709/238; 709/331; 709/321; 709/209; 709/204; 710/10; 710/72; 710/8; 710/3; 710/9; 710/104
(58) Field of Search ................................. 700/245, 246; 709/220, 230, 238, 331, 321, 209, 204; 710/72, 8, 10, 3, 9, 104

(56) References Cited

U.S. PATENT DOCUMENTS

| | | | | |
|---|---|---|---|---|
| 4,896,349 A | * | 1/1990 | Kubo et al. | 379/106.03 |
| 5,799,151 A | * | 8/1998 | Hoffer | 709/204 |
| 6,260,086 B1 | * | 2/2000 | Lancelot et al. | 370/353 |

OTHER PUBLICATIONS

Miller–Freeman PLC, Multimedia Hits The Home Front, Electronics Times, pp. 1–3, 1998.*
Yoshida, Sony Uncoupled Its Electronics Division, Tech–Web News, pp. 1–2, 1998.*
DeTar, 1394 Termed Inevitable But Issues Remain; IEEE Fire Wire Standard; Thechnology Information, Electronic News, pp. 1–2, 1998.*
Yoshida, Counsumer Vendors Set A Home–Network Agenda, TechWeb News, pp. 2, 1998.*
Brostrup–Jensen et al., The AT&T Satellite Network Control System, IEEE., pp. 1094–1102, 1992.*
Electronic Time., Bid For PC–Free Home Network, Electronic Times, page one, 1998.*
Multimedia Week., CE Vendors Select 1394 For Network, Multimedia Week Potomac, page one, 1998.*
Yoshida, Startup Touts A Video–Ready Home Network, Electronic Engineering Times, pp. 1–3, 1998.*
H SOLUTIONS, What Hitachi is doin in the network controller field, no date, Internet, pp. 1–2.*
Wendorf et al., Consumer products interact with HAVi, 2001, Internet, pp. 1–6.*
Grundig, Eight consumer electronics companies release Home Audio/Video Interoperability (HAVi) Core for Neworking Digital AV Appliances, May, 1998, Internet pp. 1–3.*
Strahl et al., Internet enabling visual FoxPro applications, 1999, Internet pp. 1–33.*

(List continued on next page.)

Primary Examiner—Jacques H. Louis-Jacques
Assistant Examiner—McDieunel Marc
(74) Attorney, Agent, or Firm—Gwenaelle Le Pennec

(57) ABSTRACT

An information processing system has an electronic device and a controller for control of a functionality of the device. An abstract representation of the functionality is provided to the controller. The abstract representation exposes a modality of controlling the functionality. The controller enables controlling the functionality through interaction with the abstract representation. The modality controls associating the control of the functionality with a modally compatible controlling capability of the controller. The modality exposed can be, for example, "Boolean", "float", "integer array".

17 Claims, 2 Drawing Sheets

OTHER PUBLICATIONS

Grundig et al., Eight consimer electronics companies release home audio/video interoperability (HAVi) core specification for networking digital AV appliances, 1998, Internet, pp. 1–4.*

HAVi, Delivering on the promise of home entertainment networking, 2001, Internet, pp. 1–24.*

Terikangas, HAVi,: Home audio video Interoperability, no date, internet, pp. 1–10.*

Moyer, et al., Sip for light bulbs using to support communication with networked appliances, 2000, Internet, pp. 1–15.*

"Proposal for a New Domestic Automation Networking System", by P. Warriner et al, IEEE Trans. on Consumer Elect., vol. 44, No. 3, Aug. 1998, pp. 612–616.

* cited by examiner

CONTROL PROPERTY IS MAPPED MODALLY COMPATIBLE GUI ELEMENT

FIELD OF THE INVENTION

The invention relates to an information processing system and a method for controlling devices.

BACKGROUND ART

A consortium of consumer electronics manufacturers, among which Philips Electronics has been working on specifications for a core of API's (application programming interfaces) for digital consumer electronics appliances in a home network so as to provide a standard for the audio/video electronics and the multimedia industries. An API specifies the method required for making requests to an operating system or application program. The home network is considered a distributed computing platform. The primary goal of the standard, referred to as the HAVi (Home Audio/Video interoperability) architecture is to ensure that products of different vendors can interoperate, i.e., cooperate to perform application tasks. Current CE devices, such as home entertainment equipment (DVD players, DV camcorders, digital TV sets, etc.) are digital processing and digital storage systems. Connecting these devices in networks makes it possible to share processing and storage resources. This allows coordinating the control of several CE devices simultaneously, e.g., in order to simplify user-interaction. For example, a first device may instantiate recording on a second device while accessing an EPG (electronic program guide) on a third device. The home network provides the fabric for connecting the CE devices. It allows connected devices to exchange both control (one device sending a command to another) and AV (audio/video) data (one device sending an audio or video stream to another device). The network has to meet several requirements in order to achieve all this. It must support timely transfer of high-data-rate AV streams. The network must support self-configuration, self-management, and hot plug-and-play. It must require low-cost cabling and interfaces.

The HAVi software architecture is platform-independent and based on Java. HAVi uses the IEEE 1394 high-performance serial bus protocol for transport of control and content among the devices connected to the network. The IEEE 1394 standard is a dynamically configurable, low-cost digital network. IEEE 1394 defines both a backplane physical layer and a point-to-point cable-connected virtual bus implementations. The backplane version operates at 12.5, 25 or 50 Mbits/sec. The cable version supports data rates of 100, 200 and 400 Mbits/ sec. The standard specifies the media, topology, and the protocol. The IEEE 1394 transport protocol is particularly useful for supporting audio and video communication protocols, due to its high data-rate capability.

The HAVi architecture controls the CE devices in the network through abstract representations of the CE devices. The abstract representations are operated upon by a controller and hide the idiosyncrasies of the associated real CE devices. The abstract representation thus provides a uniform interface for higher levels of software. The abstract representations are registered with their control properties reflecting those of the device represented. The abstract representations expose their Interoperability API's to the applications and collectively form a set of services for building portable, distributed applications on the home network.

The architecture allows a device to send a command or control information to another device in the home network. A HAVi-compliant device contains data (above abstract representation, referred to as Device Control Model or DCM, see further below) relating to its user-interface (e.g., GUI) and to its control capabilities. This data includes, for example, HAVi bytecode (Java) that can be uploaded and executed by other devices on the network. A HAVi-compliant device has, as a minimum, enough functionality to communicate with other devices in the system. During interaction, devices may exchange control and data in a peer-to-peer fashion. This ensures that at the communication level, none of the devices is required to act as the master or controller of the system. On the other hand, it allows a logical master or controller to impose a control structure on the basic peer-to-peer communication model. HAVi distinguishes between controllers and controlled devices as explained further below. A controller is a device that acts as a host for a controlled device. A controller hosts the abstract representation for the controlled device. The control interface is exposed via the API of the abstract representation. This API is the access point for applications to control the device.

HAVi-compliant CE devices are devices categorized as follows: Full-AV devices (FAV's), Intermediate-AV devices (IAV's) and Base-AV devices (BAV's).

An FAV contains a complete set of the software components of the HAVi-software architecture (see below). An FAV is characterized in that it has a runtime environment for HAVi bytecode. This enables an FAV to upload bytecode from other devices for, e.g., providing enhanced capabilities for their control. An FAV may be formed by, e.g., a HAVi-compliant Set Top box, a HAVi-compliant Digital TV receiver, and an home PC. For example, an intelligent TV receiver can be the HAVi controller of other devices connected on the network. The receiver gets the bytecode uploaded from another device for creating a UI for this device and for providing external control of this device. An icon presenting this device can be made to appear on the TV screen and user interaction with the icon may cause elements of the control program to actuate the represented device in a pre-specified manner.

An IAV does not provide a runtime environment for HAVi bytecode, but may provide native support for control of specific devices on the home network. An IAV comprises embedded software elements that provide an interface for controlling general functions of the specific devices. These software elements need not be HAVi bytecode and may be implemented as native applications on the IAV that use native interfaces to access other devices.

A BAV may provide uploadable HAVi bytecode but does not host any of the software elements of the HAVi architecture. A BAV is controllable through an FAV by means of the former uploaded bytecode. A BAV is controllable through an IAV via the native code. Communication between an FAV or IAV, on the one hand, and a BAV on the other hand requires that the HAVi bytecode be translated to and from the command protocol used by the BAV.

The main software elements included in the core specification of the HAVi architecture are the ones listed below. For a more detailed explanation of these elements, please see the HAVi spec., herein incorporated by reference.

1) A 1394 Communications Media Manager (CMM)—acts as an interface between the other software elements and the IEEE 1394.
2) An Event Manager (EM)—informs the various software elements of events in the network such as the changes in the network configuration that occur when appliances (devices) are added or removed from the network.

3) A Registry—maintains information about the appliances connected to the network and the functions they offer. Applications can obtain this information from the registry.

4) A Messaging System (MS)—serves as an API that facilitates communication between the software elements of the various appliances on the network. The messaging system provides the HAVi software elements with communication facilities. It is independent of the network and the transport layers. A messaging system is embedded in any FAV and IAV. The messaging system is in charge of allocating identifiers for the abstract representations at the FAV or IAV. These identifiers are first used by the abstract representations to register at the FAV or IAV. Then they are used by the abstract representations to identify each other within the home network. When a first abstract representation wants to send a message to another abstract representation it has to use the identifier of the latter while invoking the messaging API.

5) A Device Control Module (DCM)—represents an appliance on the network. Application programs can interact directly with a DCM. This shields them from the idiosyncrasies of each individual appliance.

6) A DCM Manager—Installs the DCMs. It automatically reacts to changes in the network by installing new DCMs for new appliances.

7) A Data Driven Interaction (DDI) Controller—renders a GUI (Graphical User Interface) on a appliance's display on behalf of a HAVi software element. It supports a wide range of displays, varying from graphical to text-only.

8) A Stream Manager (SMGR)—creates connections and routes real-time AV streams between two or more appliances on the network.

The HAVi architecture specifies at least two levels of interoperability, referred to as level 1 and level 2.

Level 1 interoperability addresses the general need to allow existing devices to communicate at a basic level of functionality. To achieve this, level 1 interoperability defines and uses a generic set of control messages (commands) that enable one device to communicate with another device, and a set of event messages that it should reasonably expect from a device given its class (TV, VCR, DVD player, etc). To support this approach a basic set of mechanisms is required: device discovery; communication; and a HAVi message set.

As to device discovery: each device in the home network needs a well-defined method that allows it to advertise its capabilities to others. The HAVi approach is to utilize so-called SDD data: self describing data. The SDD data is required on all devices in the network. SDD data contains information about the device which can be accessed by other devices. The SDD data contains, as a minimum, enough information to allow instantiation of a so-called embedded device control module (embedded DCM). An embedded DCM is a piece of code pre-installed on a controlling IAV or FAV in platform-dependent code and using native interfaces to access the IAV's or FAV's resources. As mentioned above, a DCM for a device is a software element that provides an interface for control of general functions of the device. Instantiation of an embedded DCM results in registration of the device's capabilities with a registry. The registry provides a directory service and enables any object on the network to locate another object on the network. Registering allows applications to infer the basic set of command messages that can be sent to a specific device on the network.

As to communication: once an application has determined the capabilities of a device, the application needs to be able to access those capabilities. This requires a general communication facility allowing applications to issue requests to devices. This service is provided by the HAVi messaging systems and DCMs. The application sends HAVi messages to DCMs, the DCMs then engage in proprietary communication with the devices.

As to HAVi message sets: in order to support level 1 interoperability a well-defined set of messages is required that must be supported by all devices of a particular known class (e.g., the class of TV receivers, the class of VCR's, the class of DVD players, etc.). This ensures that a device can work with existing devices, as well as with future devices, irrespective of the manufacturer.

These three basic requirements support a certain minimal level of interoperability. Since any device can query the capabilities of another via the registry, any device can determine the message set supported by another device. Since applications have access to the messaging system, any device can interact with any other device.

Level 1 interoperability ensures that devices can interoperate at a basic level of functionality. However, a more extended mechanism is needed to also allow a device to communicate to other devices with any additional functionality that is not present in the embedded DCM's on an FAV. For example, embedded DCM's may not support all features of existing products and are unlikely to support those totally new ones of future product categories. Level 2 interoperability provides this mechanism. To achieve this, the HAVi Architecture allows uploadable DCM's as an alternative to the embedded DCM's mentioned above. The uploaded DCM may replace an existing DCM on an FAV. An uploadable DCM may be provided by any suitable source, but a likely technique is to place the uploadable DCM in the HAVi SDD data of the BAV device, and upload from the BAV to the FAV device when the BAV is connected to the home network. Because the HAVi Architecture is vendor-neutral, it is necessary that the uploaded DCM will work on a variety of FAV devices all with potentially different hardware architectures. To achieve this, uploaded DCMs are implemented in HAVi (Java) bytecode. The HAVi bytecode runtime environment on FAV devices supports the instantiation and execution of uploaded DCMs. Once created and running within a FAV device, the DCM communicates with the BAV devices in the same manner as described above.

The efficiency of level 2 interoperability becomes clear when one considers resources needed to access a specific device functionality. Level 2 allows a device to be controlled via an uploaded DCM that presents all the capabilities offered by the device, whereas to achieve similar functionality in level 1, this DCM would have to be embedded somewhere in the network. For example, when a new device is added to a network, level 1 requires that at least one other device comprises an embedded DCM compatible with the new device. In comparison, level 2 only requires that one device provide a runtime environment for the uploaded DCM obtained from the new device.

The concept of uploading and executing bytecode also provides the possibility for device-specific applications called Device Control Applications. Through these applications a device manufacturer can provide the user a way to control special features of a device without the need for standardizing all the features in HAVi. The application is provided by a DCM in HAVi bytecode and can be uploaded and installed by each FAV device on the network.

For further information, reference is made to the HAVi specification and the IEEE 1394 specification that are available in the public domain.

OBJECT OF THE INVENTION

As described above, a controlling application has to know a message set of the abstract representation in order to control a device's functionality. Two basic approaches are being used to ensure this compatibility: standardized/embedded modules and uploadable modules. As to standardization: a set of commands supported by a particular type of a functionality is defined by the specification. See, for example, definitions for a tuner in the HAVi spec. As to uploadable modules: a GUI component or an application installed on a controllable device can be uploaded from the controllable device and be executed in the runtime environment provided by the hosting HAVi-controller. However, both methods do not allow third party applications or the runtime environment itself to determine the semantics of the properties of a new or a device with functionalities unknown heretofore. This implies that under the current approach an ongoing standardization effort is required for new types of devices nevertheless. In the case of uploadable GUI-controls or applications it is up to the device, not the more "intelligent" controller to determine user interaction or control modalities. For example, if the runtime provided a new type of user interaction, such as voice control, the uploaded control application would not be able to use it if it had not been designed for that kind of input. Testing for compatibility with new devices presents a real challenge for the developers and designers, since the new functionalities and UI have (by definition) not yet been defined, let alone developed.

It is therefore and object of the invention to provide a solution to this problem of compatibility that will be encountered when new (i.e., unknown heretofore) functionalities make their appearance in a home network, wherein control of resources is based on pre-installed or uploadable abstract representations.

SUMMARY OF THE INVENTION

To this end the invention provides a home network system comprising an electronic device and a controller coupled to the device. The device exposes an abstract representation of its functionality to the controller. The controller enables controlling the device's functionality through interaction with the abstract representation. The abstract representation specifies a modality of controlling the functionality. Under control of the modality specified, the system associates the controlling of the functionality with a modally compatible controlling capability of the controller. The modality exposed can be, for example, "Boolean", "float", "integer array".

The term "modality" refers to an attribute that denotes the character of the controllability of the functionality. In the invention, the modality of the functionality is mapped onto a modaly compatible capability of the controller without the controller actually having to know what the functionality of the device is all about. For example, assume that the modality is semantically a Boolean. The Boolean control property can then be mapped onto a UI element that has a Boolean character and assumes one of two states such as an "on/off" switch or "high/low" lever. When the user then interacts with this element, the functionality mapped onto it is put into one of the two states. In a HAVi system, the abstract representation gets uploaded, preferably including a UI (for, e.g., voice control) or GUI, and the user receives a context to determine the consequences of his/her interactions with the UI. In case the modality is a set of discrete values, the control property can be mapped onto a GUI element that can assume one of three or more discrete states such as a dial for channel selection on a device, for selection among multiple devices, etc. If the specified modality is semantically a range of floating-point values, a mapping is feasible onto a continuously variable control feature, e.g., brightness of an image on a display or sound volume. In another example, the specified modality is semantically an array. An array comprises more than a single component. For example, an array of Booleans could thus be mapped onto a cluster of GUI elements to implement, e.g., a menu selection among different devices or a check box list. An array of floating point modalities could be mapped onto a cluster of GUI elements that represent sliders, e.g., for adjusting a camera angles and zoom factors of cameras in the home security system that is controlled via the home network. Note that the controller does not need to have a clue about the functionality or functionalities of the device being controlled. All it needs to do is subjecting a functionality to a control application based on the semantics of its modality.

Note that the DDI of the HAVi architecture specifies the manner in which a device gets controlled through GUI widgets. The term "widget" is used in various ways in the field of computers. A widget is an element of a GUI that displays information for a user to interact with the operating system and application programs. Widgets include icons, pull-down menus, buttons, selection boxes, progress indicators, on-off checkmarks, scroll bars, windows, window edges for resizing the window, toggle buttons, etc. for displaying user interactivity functionalities. In programming, a widget also means the small program that is written in order to describe what a particular widget looks like, how it behaves, and how it interacts in response to user actions. Most operating systems include a set of ready-to-tailor widgets that a programmer can incorporate in an application, specifying how it is to behave. New widgets can be created. Most application development languages today, such as Java and Tcl, come with a ready-made library of widgets that a programmer can incorporate and modify. Using Microsoft's Visual Basic, a widget can be implemented as or part of an ActiveX control, etc. (See, e.g., www.whatis.com). The UI does not need to know the functionality of the particular device to be controlled, it only needs to know which widget to present. The widgets determine how the UI is structured. Now, if the UI paradigm differs from previous versions or if a dedicated widget does not exist (e.g., new voice control or 3D GUI) in the available environment, the invention enables controlling the device nevertheless by providing the controls in a different, but semantically equivalent manner. The widget manager or UI wizard (referred to more generically as configuration application/service/module/entity) program can put together a functional UI by means of matching the available UI elements with the semantic description of the modality in the abstract representation of the device.

The configuration entity monitors the appearance of new devices. If a new device appears, the entity checks if there is a GUI available for this type of device. If there is one available, the entity retrieves it. If there is none, the configuration entity creates a UI representation and makes it available to the controller. The configuration entity gets the object description and then activates a mapper with the description, basically saying: "This is a property, now give me a an associated UI element". This can be done automatically or with user intervention. The mapper is wizard-like, e.g., a utility within an application that helps to use the application to perform a particular task.

Component-based software models have become widely available and accepted in the software development industry. Technologies such as HTML, COM, DCOM, ActiveX, Java, JavaBeans provide developers with a wide range of ready-to-use GUI components. Semantics of such components are well understood by end-users and allow creating a sophisticated applications in a short period of time.

As manufacturers introduce new HAVi-compliant devices with new features, they can modify the bytecode shipped with the device. The modifications added to the bytecode represent the new functionalities and new features provided by the device. Similarly, new UI elements can be added to the available UI representation of the device. The HAVi architecture allows device manufacturers to specify GUI's which can be rendered on a variety of display apparatus, ranging from text-only displays to high-level graphics displays. The invention facilitates development and market penetration of information processing systems such as the HAVi-based home entertainment equipment of home automation systems.

The invention is discussed above within the context of a HAVi architecture. The applicability of the invention is not limited to HAVi-based systems. As another example, consider a client-server model based on Component Object Model (COM) technology of Microsoft. For more information, reference is made to, e.g., the Component Object Model Specification version 0.9 of October 1995 as supplied by Microsoft, herein incorporated by reference. COM is object-oriented. An object has properties that represent control functionalities of an associated electronics device as exposed to a software application. A state change of an object as a consequence of an event from outside is passed on to the software application. The application manipulates the objects by changing or setting their properties. When the application modifies a property of an object associated with a certain physical device a command is sent to the associated device.

COM is a generic mechanism allowing applications to communicate in a consistent way and is a framework for developing and supporting program component objects. It provides capabilities similar to those defined in CORBA (Common Object Request Broker Architecture), the framework for the interoperation of distributed objects in a network. OLE (object linking and embedding) provides services for the compound document that users see on their display, COM provides the underlying services of interface negotiation and event services (putting one object into service as the result of an event that has happened to another object). In this implementation clients are modeled as OLE Automation objects (abstract representations) that use properties to expose controls and events to signal state changes. OLE Automation is a COM technology that enables scripting and late binding of clients to servers. OLE Automation provides communication with other programs through calls to features (commands and queries) that the programs have made available for external use. Before using an object, a client application has first to obtain the object's interface pointer. The interface pointer is obtained through the network's directory by binding the object's name or by enumerating devices. Standard COM API's for moniker binding can be used. References to objects can be obtained by calling GetObject or CoGetObject with a string specifying the desired device's name or ID. The application can then manipulate the object by setting or retrieving its properties. When an application sets or modifies a property of an object corresponding with a device the property-setting operation or modification operation is converted into a command that is sent across the network to the relevant device. The objects may differ in implementation, but expose a similar property-based model to client applications running on a controller, e.g., a PC with a Windows-based operating system (e.g., WINDOWS95, WINDOWS98, WINCE, WINDOWS NT). Accordingly, a controlling application or a GUI element has to know the property set of the controllable device.

Again, in the invention, the objects are made to expose their properties in such a manner that the control modality of the property's functionality can be associated with a modally compatible controlling capability of the controller under control of this modality alone.

For yet another example of a technology wherein the invention provides an advantage over the state of the art consider Jini of SUN MICROSYSTEMS. Jini is a Java-based software technology that assists in networking PCs and peripherals. When plugged into a network, a Jini-enabled device will broadcast its presence. Network clients that are ready to use that device can request the necessary software from the device, bypassing a server or a network administrator. This architecture builds on top of an existing network. The network itself is assumed to have been configured in advance. Programming interfaces are identified by the type system of the Java programming language, and services can be found in a look-up service by asking for those that support a particular interface. Finding a service this way ensures that the program looking for the service will know how to use that service, because that use is defined by the set of methods that are defined by the type. The set of methods are pre-specified in order to have a meaningful cooperation among the components. In the invention, it is the modality that determines a mapping onto suitable controls without any prespecified methods being necessary.

The invention also relates to a method of enabling control of a functionality of an electronic device via a controller. The method comprises enabling providing an abstract representation of the functionality to the controller; enabling the abstract representation to expose a modality of controlling the functionality for enabling the controller to control the functionality through interaction with the abstract representation; and under control of the modality exposed enabling associating the control of the functionality with a modally compatible controlling capability of the controller. The enabling refers to, e.g., providing the necessary software tools to the end user as a software package that comes with the device or with the complete home automation system, or is downloaded via the Internet, or to activities by a service provider or the end user himself/herself while setting up the control configuration.

The invention also facilitates customizing of UI from the manufacturer's point of view, not only for home or office based systems, but also for, e.g., cars. The UI of components such as radio controls, CD player controls, cruise controls, airconditioning controls, etc. can be customized through a semantic coupling mechanism as specified above, thus creating a built-in upgradability. Similarly the presentation of engine and car management information (tachometer, rev. counter, odometer, engine temperature, oil pressure etc.) can be customized by semantically coupling the information presentation functionality to a desired lay-out.

BRIEF DESCRIPTION OF THE DRAWINGS

The invention is explained by way of example and with reference to the accompanying drawings, wherein.

Throughout the figures, same reference numerals indicate similar or corresponding features.

PREFERRED EMBODIMENTS

Figure 1:
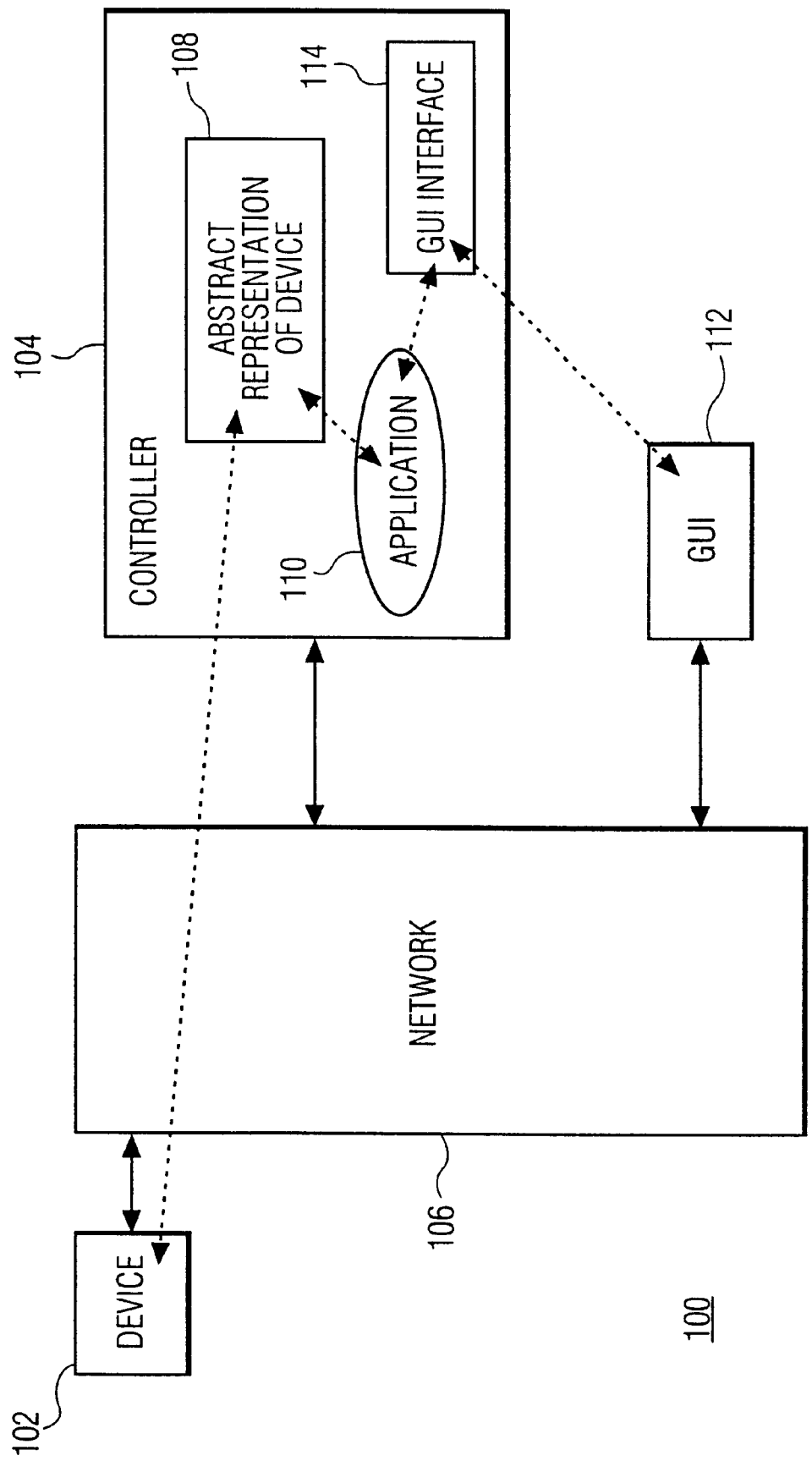
FIG. 1 is a diagram of a home network system in the invention.

FIG. 1 is a block diagram of an information processing system 100 of the invention. System 100 comprises an electronic device 102 and a controller 104 coupled to the device, e.g., via a network 106. System 100 may comprise more electronic devices, but these are not shown in order to not obscure the drawing. Device 102 exposes to controller 104 an abstract representation 108. Representation 108 is, for example, uploaded to controller 104 upon functional connection of device 102 to network 106. Representation 108 could also be installed on controller 104 in another way, e.g., via the Internet or by the user via a diskette. Controller 104 controls a functionality of device 102 through software application 110 interacting with representation 108. Application 110 further enables the user to control system 100 via a user interface device, e.g., a GUI device 112. GUI 112 has an abstract representation 114 interfacing with application 110. Interface 114 has been uploaded to controller 104 or it has been installed by the manufacturer or the user.

Assume that GUI device 112 or controller 104 does not have any prior knowledge about the functionality of device 102. That is, device 102 is a black box from the point of view of device 112 and controller 104. Representation 108 now specifies a modality of the controlling of the functionality. That is, representation 108 has an attribute that denotes the character of the control for the functionality. Representation 108 exposes the device's functionality to application 110 as comprising, for example, following entities: Name, Type, Value(s) Allowed, Display Name. Herein, "Name" is a label through which the functionality can be accessed by application 110. "Type" specifies the modality (e.g., Boolean, integer, float, array) of control for the functionality of device 102. "Value(s)" specifies one (or more) numerical value(s) that the modality is capable of assuming with regard to this functionality. "Display Name" indicates how the functionality of device 102 is to be represented at GUI 112 if the "Display name" is different from "Name".

For example, device 102 has a Name: "Tuner" and its functionality has a Name: "Channel". Type of device 102 is specified as "Integer". Values for this functionality is specified as a list of discrete numerical values 0, 1, 2, . . . , 5, 34, 56, . . . , 89. Upon retrieval of this description of the functionality, controller 110 generates a snippet of control script, for example, in the following sequence:

a) get the device name→(Tuner);
b) get the functionality name→(Channel);
c) get the functionality type→(Integer);
d) get the functionality value(s)→(0, 1, 2, . . . , 5, 34, 56, . . . , 89);
e) generate a test script code by using the system scripting rules (such as OLE Automation, Visual Basic Script, JavaScript, etc.) and above quantities retrieved:
   for each Value in values
      Tuner.Channel=Value
   endfor This control script enables testing the controllability of the functionality.

In a similar manner, controller 104 generates a control script to associate the control modalities is presented by abstract representation 108 with semantically similar modalities available in system 100, e.g, as provided by GUI interface 114. The controller accomplishes this with the help of a widget manager program or a UI wizard program. Note that the mapping is determined by the modality specified. This is further explained with reference to FIG. 2.

Figure 2:
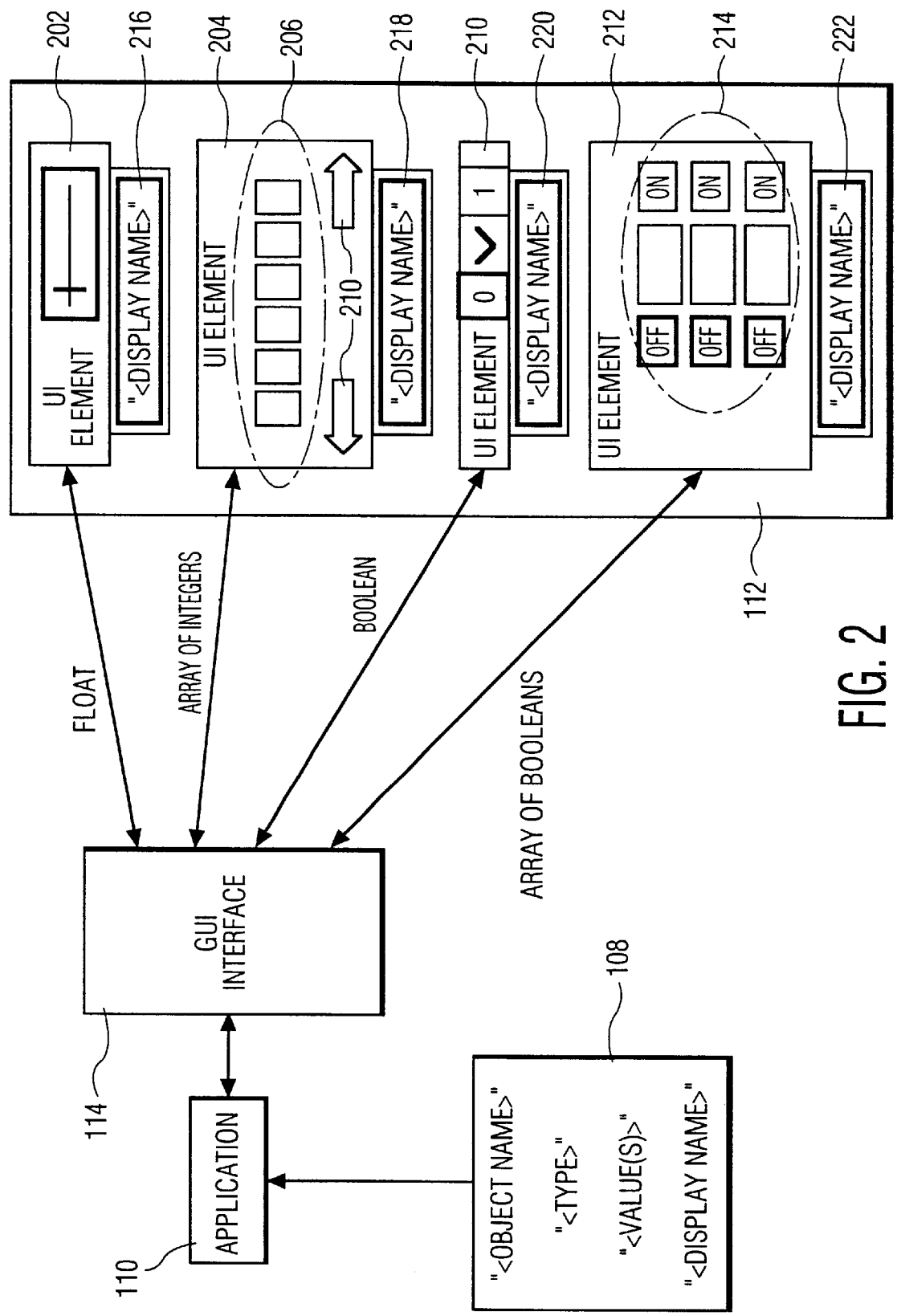
FIG. 2 is a diagram illustrating the modal mapping.

FIG. 2 is a diagram illustrating the modal mapping. As mentioned above, representation 108 provides certain key information in terms of the name of the device, the type, values and display name. GUI device 112 has an abstract representation 114 that specifies the modal capabilities of control device 112. These capabilities are installed using standardized UI software components.

For example, device 112 is capable of letting the user adjust a certain parameter on a continuous scale 202 as if the quantity assumes a floating-point value. A functionality that has a type "float" is mapped onto this GUI element 202. GUI element 202 is here graphically represented by a slider. On a touch screen the user can adjust the position of the slider through dragging it to the desired position. Alternatively, if the UI is represented on a display screen of a television set (not shown), the user can click and drag the slider with a mouse (not shown) or a wireless keyboard (not shown) or another control device (not shown). If the UI has a physical rotary dial or a physical slider, the float can be mapped onto this control feature. The graphical representation itself of GUI element 202 can, but need not, be part of abstract representation 108. A functionality that can thus be mapped onto element 202 is, for example, volume of sound or brightness of ambient lighting.

If a controllable functionality of device 102 has a modality "integer array", the control of this functionality is mapped onto GUI element 204. GUI element 204 has a plurality of selectable buttons 206 that can be scrolled in and out of view through selecting arrows 210. An example of an integer array is a group of numerical values indicative of a selection of television channels or CD's in a carousel. If a controllable functionality of device is a Boolean, the controls are mapped onto a GUI element 210 through which the user can select one of two states (on-off; activate-deactivate; high-low, etc). If a controllable functionality comprises an array of Booleans, it can be mapped onto GUI element 212 that has a plurality of soft keys 214 and that is functionally equivalent to a check box widget.

In order to help the user identifying certain controls, the item "Display name" is provided in representation 108. "Display name" is the label (e.g., name in alphanumeric characters, or an icon) to be displayed on GUI 112 to provide the context for the user. The user is thus enabled to interpret the semantics of the controls. Display name boxes are indicated by reference numerals 216, 218, 220 and 222.

Reference is made to Attorney Docket No. PHA 23,492, filed Sep. 2, 1998 for Yevgeniy Shteyn for "LOW DATA-RATE NETWORK REPRESENTED ON HIGH DATA-RATE HAVi-NETWORK ", U.S. Ser. No. 09/146,020, incorporated herein by reference. This document relates to a PC-based home automation system that uses a low data-rate transport layer and COM-based software components for control of devices in a home automation network. The home automation system is merged with a messaging-based HAVi-network that uses IEEE 1394 as a high data-rate transport layer. The HAVi-network controls audio/video equipment in a home entertainment system. The home automation services and devices are registered as a HAVi-compliant elements with the HAVi network's FAV or IAV device. The home automation resources (devices and services) have both COM OLE Automation Interfaces and HAVI-compliant interfaces to permit control of the home automation system from the HAVi-network.

Reference is made to Attorney Docket No. PHA 23,488, filed Aug. 13, 1998 for Lawrence Freeman for "HOME-NETWORK AUTOCONFIGURATION", U.S. Ser. No. 09/133,622, incorporated herein by reference. This document relates to automatic configuration of PCs in a network, preferably a home network, in order to share resources registered at the individual PCs. Services and resources local to one PC are registered with the other PC and vice versa. The registry hides whether a service or resource is remote or local. In operational use of the network, a resource or service local to one PC is addressable from the remote PC as if it were local to the latter.

Reference is made to Attorney Docket No. PHA 23,438, filed Jun. 30, 1998 for Yevgenyi Shteyn and Gregory Gewickey for "DYNAMIC DE-REGISTERING OF DEVICES IN SYSTEM WITH MULTIPLE COMMUNICATION PROTOCOLS", U.S. Ser. No. 09/107,525, incorporated herein by reference. This document relates to an information processing system that has first and second electronic sub-systems, and control means for controlling the sub-systems. At least the first sub-system has a software representation registered with the control means. The control means changes a state of the first sub-system through interacting with the software representation. The first and second sub-systems are also capable of interacting directly with one another without the control means being involved. To avoid conflicts, at least the first sub-system is capable of de-registering with the control means so as to functionally disable its software representation at the control means.

Reference is made to Attorney Docket No. PHA 23,169, filed Oct. 15, 1996 for Paul Chambers and Saurabh Srivastava for "TASK-DRIVEN DISTRIBUTED MULTIMEDIA CONSUMER SYSTEM", U.S. Ser. No. 08/731,624, incorporated herein by reference. This document relates to a control system that comprises multiple consumer electronics devices and task-driven control means coupled to the devices for controlling an interaction among the devices. The control means acts on respective software representations of each respective one of the consumer devices. By encapsulating the variable complexity of the task within a software representation, it can be made as simple or as sophisticated as needed to bring the capabilities up to a common level. Since the level of interface is common to the devices, applications can uniformly manipulate devices which embody very different levels of sophistication.

I claim:

1. An information processing system comprising an electronic device and a controller for control of a functionality of the device, wherein:
   an abstract representation of the functionality is provided to the controller;
   the abstract representation exposes a modality of controlling the functionality;
   the controller enables controlling the functionality through interaction with the abstract representation; and
   the modality determines associating the control of the functionality with a modally compatible controlling capability of the controller.

2. The system of claim 1, wherein the modality is specified as semantically a Boolean.

3. The system of claim 1, wherein the modality is specified as semantically a set of discrete values.

4. The system of claim 1, wherein the modality is specified as semantically a range of floating-point values.

5. The system of claim 1, wherein the modality is specified as semantically an array.

6. The system of claim 1, wherein the modality is specified as semantically another abstract representation.

7. The system of claim 1, wherein the controlling capability is accommodated in a GUI.

8. The system of claim 1, comprising a home automation network.

9. The system of claim 8, comprising a HAVi-based network.

10. A method of enabling control of a functionality of an electronic device via a controller for control of the functionality, the method comprising:
    enabling providing an abstract representation of the functionality to the controller;
    enabling the abstract representation to expose a modality of controlling the functionality for enabling the controller to control the functionality through interaction with the abstract representation; and
    under control of the modality exposed enabling associating the control of the functionality with a modally compatible controlling capability of the controller.

11. The method of claim 10 further comprising:
    displaying a graphical user interface element on a graphical user interface, the element corresponding to the modally compatible controlling capability of the controller; and,
    enabling a user to interact with the element to control the functionality.

12. An electronic device for use with a controller for control of a controllable functionality of the device, wherein:
    the device comprises an abstract representation of the functionality for enabling the controller to control the functionality through interaction with the abstract representation;
    the abstract representation allows exposing a modality of controlling the functionality to the controller;
    the modality controls associating the control of the functionality with a modally compatible controlling capability of the controller.

13. The device of claim 12, wherein the modality is specified as semantically a Boolean.

14. The device of claim 12, wherein the modality is specified semantically a set of discrete values.

15. The device of claim 12, wherein the modality is specified as semantically a range of floating-point values.

16. The device of claim 12, wherein the modality is specified as semantically an array.

17. The device of claim 12, wherein the modality is specified as semantically another abstract representation.

* * * * *